United States Patent [19]

Hartley et al.

[11] Patent Number: 5,511,109

[45] Date of Patent: Apr. 23, 1996

[54] SECURITY SYSTEM USING CALL DISPLAY

[75] Inventors: Douglas Hartley, Dollard-des-Ormeaux; Doan N. Huan, Montreal North; Sean Bailey, Point Claire, all of Canada

[73] Assignee: Sur-Gard Security Systems Ltd., Downsview, Canada

[21] Appl. No.: 130,502

[22] Filed: Oct. 1, 1993

[51] Int. Cl.⁶ .......................... H04M 11/00; H04M 11/04
[52] U.S. Cl. .................. 379/40; 379/45; 379/49; 379/142
[58] Field of Search ................. 379/37–51, 142

[56] References Cited

U.S. PATENT DOCUMENTS

| | | | |
|---|---|---|---|
| 4,465,904 | 8/1984 | Gottsegen et al. | 379/42 |
| 4,993,059 | 2/1991 | Smith et al. | 379/39 |
| 5,027,383 | 6/1991 | Sheffer | 379/39 |
| 5,033,076 | 7/1991 | Jones et al. | 379/45 |
| 5,109,399 | 4/1992 | Thompson | 379/45 |
| 5,134,644 | 7/1992 | Garton et al. | 379/39 |
| 5,311,569 | 5/1994 | Brozovich et al. | 379/45 |
| 5,327,478 | 7/1994 | Lebowitz | 379/40 |

*Primary Examiner*—Wing F. Chan

[57] ABSTRACT

An improved alarm security system is disclosed which provides caller identification information when an alarm panel completes a telephone communication with a central computer. Such information is automatically provided by the telephone network upon initiation of a telephone communication. The central computer can use this information alone or in combination with other information received from the alarm panel to improve reliability and provide a more effective security system.

9 Claims, 2 Drawing Sheets

SECURITY SYSTEM USING CALL DISPLAY

FIELD OF THE INVENTION

The present invention relates to security systems, and in particular, relates to security systems which send alarm signals to a central computer over the telephone network which provides information specific to the service used by the party originating the communication.

BACKGROUND OF THE INVENTION

Security systems for both residential and commercial applications have gained wide acceptance and central monitoring of such security systems is typically recommended. To protect a particular location, a number of sensors monitor the area and these sensors communicate with an on-site alarm panel. The alarm panel acts as a central source for the sensors and relays this information through a publicly switched telephone network to a central computer. The central computer, upon receipt of the information which includes the identity of the alarm panel, processes the information and based on this processed information, takes or initiates certain predetermined steps. These steps can include producing an operator report and advising local police, fire-fighters or private security personnel. Note that these steps are only representative of a host of possible steps which will vary depending on the particular application and/or alarm panel.

The installation of such systems typically requires the installer to input certain information into the alarm panel. There is some concern that all installation information may not be properly inputted to accurately identify the alarm panel or, subsequent to installation may subsequently corrupted, either by accident or purposefully. The present invention provides a simple arrangement for reducing installation difficulties and for confirming or providing additional information regarding the identity of the particular alarm panel.

SUMMARY OF THE INVENTION

In a security system, according to the present invention, a host of alarm panels at remote locations are capable of communicating via a telephone network, having a caller identification system, to a central station or computer and provide information thereto regarding alarm conditions. A receiving arrangement receives information from the alarm panels and receives information from the telephone network which telephone network information is particular to the telephone service used by the alarm panel. When an alarm panel originates a communication with the receiving arrangement, the receiving arrangement receives caller identification information from the telephone network and combines or links this information with the information from the alarm panel. This combined signal is then forwarded in an electronic signal to the central computer for processing and suitable response.

According to the invention, the receiving arrangement receives telephone communications from alarm panels and upon initiation of a telephone communication, receives caller identification information provided by the telephone network used to complete the telephone communication. The caller identification information is particular to the telephone service or telephone account used by the calling alarm panel and may be example, the telephone number of the calling alarm panel. The receiving arrangement combines or links the caller identification information with information communicated by the alarm panel and forwards this combined information in an electronic signal for subsequent processing. Such subsequent processing is typically carried out by a computer, but in a simple system the signal may be sent to a printer for printing a report. The receiving arrangement is preferably separate from the computer, but can be an integral part of the computer, if desired.

A security system according to the present invention, comprises a host of alarm panels, each of which, on occasion, receives signals from sensors indicating the presence of an alarm condition in the space being monitored. Each alarm panel is capable of originating a telephone communication over a telephone network with a central computer and provides information signals thereto regarding particular alarm conditions and the identity of the alarm panel. The central computer processes information from the information signals, and based thereon, adopts an appropriate course of action. A receiving arrangement acts as an intermediary between the computer and any of the alarm panels. The receiving arrangement, upon receipt of a telephone communication from any of said alarm panels, also receives telephone network information from the telephone network, which is particular to a telephone service used by the alarm panel to originate the telephone communication. The receiving arrangement, upon receipt of the telephone communication from an alarm panel, combines or links the telephone network information with information received from the alarm panel and provides this information in an electronic signal to the central computer for processing.

The telephone network can also provide other useful information, such as the time and date of the call or other information. In any event, the information is combined with alarm information from an alarm panel and provided to a computer for processing.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
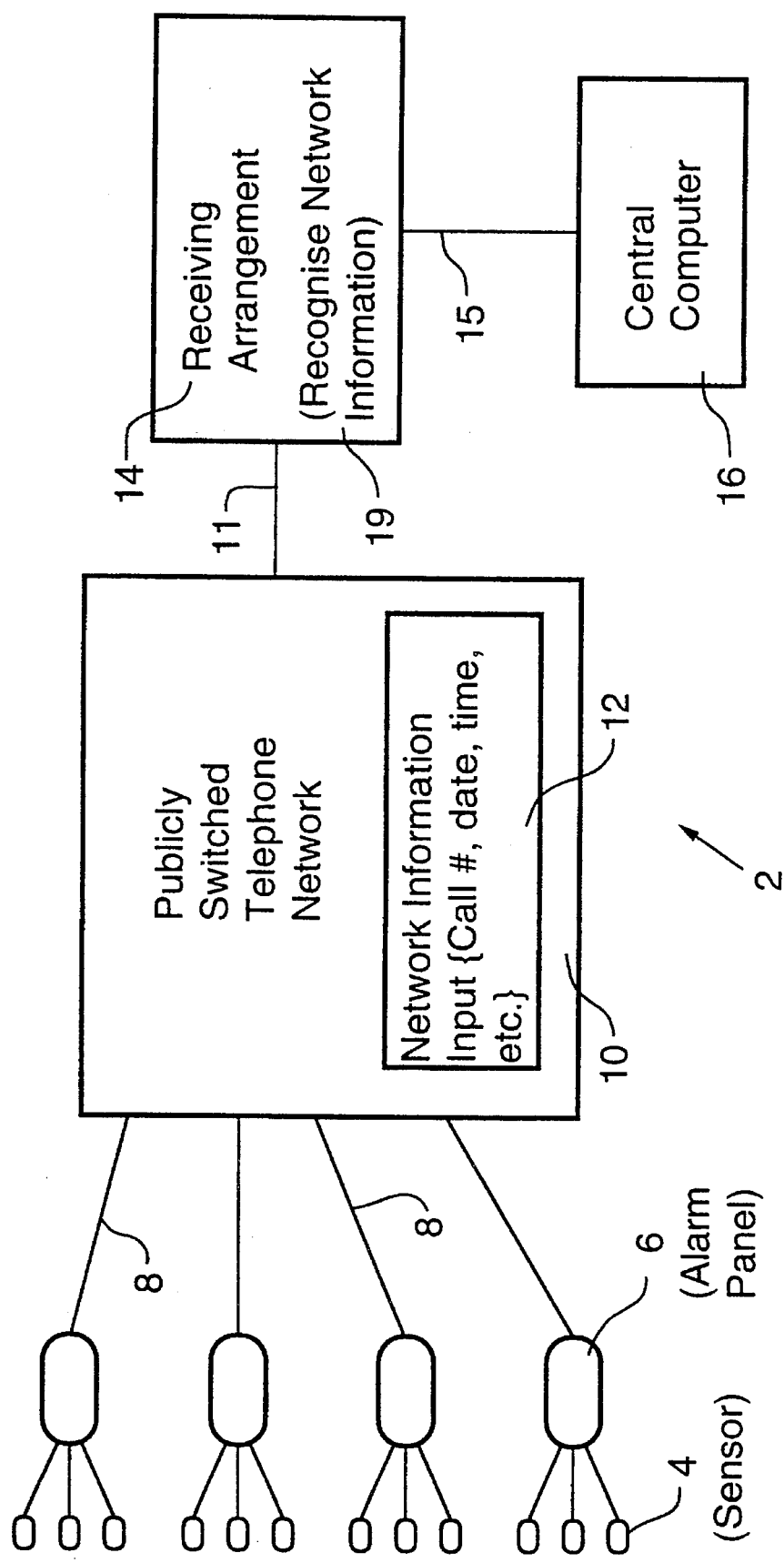
FIG. 1 is a schematic of a security system according to the present invention.

The security system, generally shown as 2, includes a host of sensors 4 which typically monitor a given space and provide information to a particular alarm panel 6 regarding the status of such monitored space. A number of alarm panels are shown and each alarm panel would be associated with a particular location or premises being monitored. There are typically at least several sensors which provide information to a given alarm panel. Upon detection of an alarm condition by one of the sensors, a signal is sent to the alarm panel which then processes the signal. The alarm panel then typically completes a telephone communication with the central computer generally indicated as 16.

The schematic illustrates this telephone communication by the telephone channel 8 being connected to the publicly switched telephone network 10 which is connected by channel 11 to the receiving arrangement 14. In a normal system, the alarm information would be forwarded through the publicly switched telephone network 10 to a receiving arrangement 14 which then forwards the information on to the central computer 16 through the communication channel 15. The telephone network 10 can be a land line system, a wireless system, a cellular system or any combination thereof or other combinations or systems that provide a telephone network.

To improve this arrangement, the receiving arrangement 14 includes substructure 19 which recognizes call identification information or information particular to the telephone service which the alarm panel 6 uses to effect the communication. Note that other information could be provided by the network which is useful to, or processed by, the central computer 16. In the schematic, the publicly switched telephone network has a computer indicated as 12 which inputs this caller identification into the signal provided to the destined receiving arrangement 14. The receiving arrangement 14 receives the caller identification information which is typically communicated between the first and second rings of the incoming call. The receiving arrangement 14 combines or links this telephone network information with the information subsequently received, after the receiving arrangement has answered the incoming telephone call and established communication with alarm panel 6, from the alarm panel. Typically, the information from the alarm panel also includes its own preprogrammed account or identity information; however, now further identification of the alarm panel is provided, namely the caller identification information (typically a telephone number). This combined information can then be processed by the central computer 16. The central computer, as part of its records, can pair what should be the proper account number and the proper telephone network information. If, at a later point in time, there is any discrepancy with either the account number received or the caller identification, this will be recognized by the central computer 16. The caller identification should be accurate, as it is provided by the publicly switched telephone network 10 and is not subject to possible alarm panel installation errors or purposeful corruption at the protected premises. When a discrepancy is realized by the central computer, a predetermined protocol can be followed.

Figure 2:
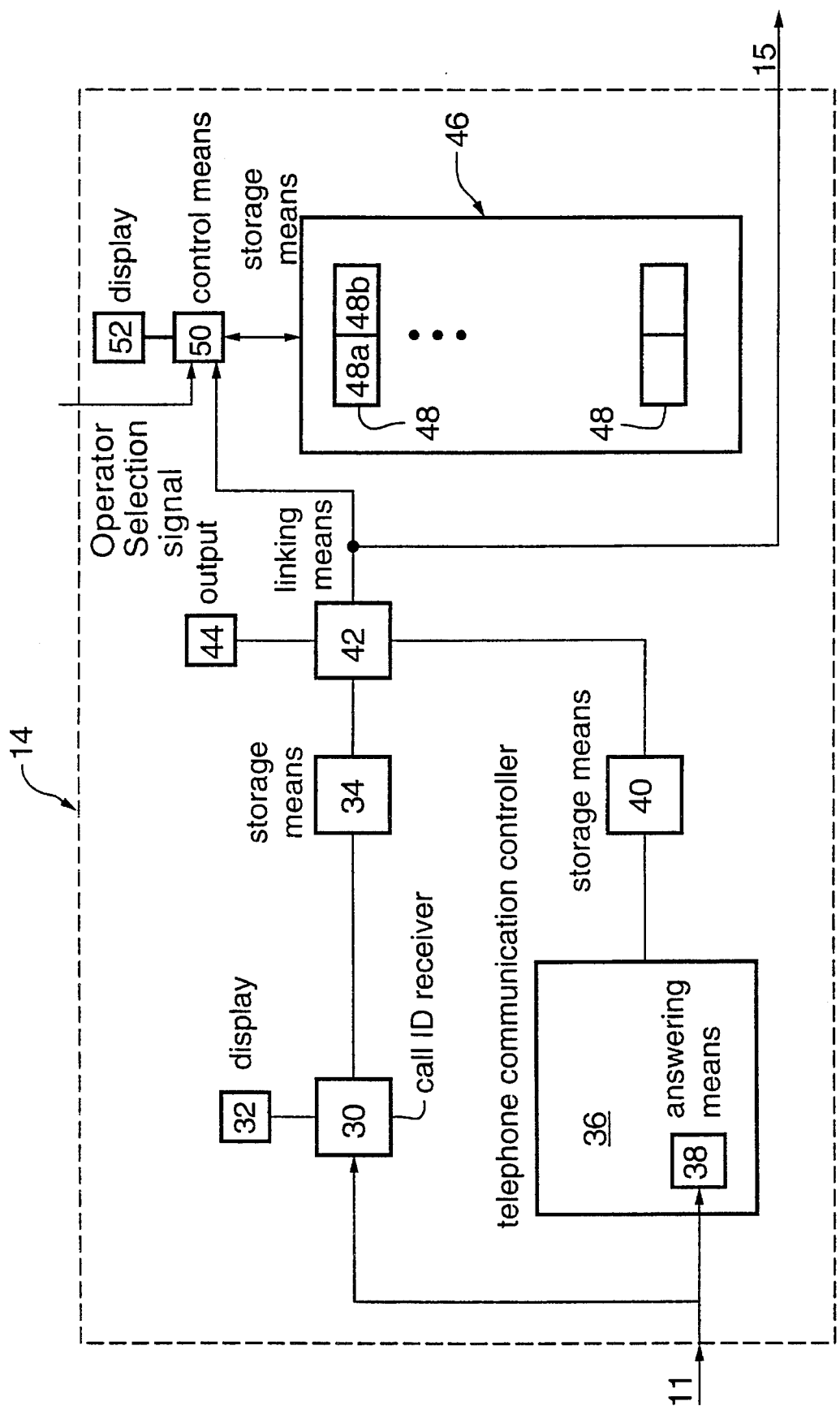
FIG. 2 is a schematic of one embodiment of a receiving arrangement used in the system.

Referring to FIG. 2, one embodiment of a receiving arrangement 14 is shown in more detail. In particular, incoming communication channel 11 is connected to a caller identification receiving means 30, which functions to receive and interpret, in conventional fashion, the caller identification information supplied by the telephone network, and to generate an electronic signal corresponding to same. If desired, the caller identification information can be immediately displayed at display 32. The caller identification information is then temporarily stored in storage or buffer means 34. After receipt of the caller identification information by receiver 30 and a predetermined number of telephone ring signals, telephone communication control means 36, which includes a telephone answering means 38, automatically answers the telephone and establishes communication with alarm panel 6, again in conventional fashion. Typically, a "handshake" system is used, whereby upon answering means 38 answering the call, controller 36 will issue a handshake signal to the alarm panel 6. Upon recognition of the handshake signal, alarm panel 6 will then transmit the relevant alarm panel information. Controller 36 then transfers the alarm panel information to another temporary storage or buffer means 40. Linking means 42, which could be a microprocessor, links or combines the information stored in buffer 34 and information stored in buffer 40. The linked or combined information could, if desired, be immediately output to output device 44, such as a printer or an LED, LCD or other display. The combined or linked information is also made available as an electronic or other digital data signal to central computer 16 via output channel 15.

In addition, in a preferred embodiment of receiver 14, the linked or combined information is transferred electronically to storage means 46, which comprises a number, say 256, of registers 48. Each register 48 can be comprised of one physical register sized to be able to hold the entire combined telephone network and alarm panel information. Alternatively, each register could physically be constituted by two separate registers, e.g. 48a and 48b, whereby the telephone network information and the alarm panel information, although stored separately in the two separate registers, are linked together through appropriate addressing information. The operation of storage means 46 is controlled by a controller 50, which again could be a microprocessor, whereby the signals relating to different telephone calls to the receiver 14 are stored in, and can be retrieved from, the different registers 48 of storage means 46. In the example, up to 256 different telephone calls or alarm events could be received and the combined or linked information from each could all stored in storage means 46. A display means 52 is also provided, whereby information from a register 48 can be displayed to an operator. Control means 50 is also preferably provided with a means to provide operator selection input, so that an operator could, for example, review the contents of any the registers, as desired.

In the case where each register is actually comprised of two separate registers linked together, control means 50 operates to call up and display at display 52 the information in the first register, followed by displaying the information in the second linked register.

It will be appreciated that the various displays 32, 44 and 52 could be combined into one. Likewise, microprocessors 42 and 50 could be one microprocessor carrying out different functions at different times.

During initial installation, the alarm panel 6 can be required to complete an initial installation communication with the central computer 16 which will receive and store the caller identification from the telephone network. Possibly, a particular telephone number can be used to indicate an initial setup is intended or a special signal can be sent. At that point, the central computer or an installation computer can then relay information to the alarm panel to provide it with its own account number, which has now been paired with the caller identification information of the service with which it is installed. In this way, increased reliability can be obtained and the system is less subject to quality control variations. It is also possible to have the installer manually input the account number which is checked by the computer, and if correct, paired with the telephone network information. It is also possible to have the account number preassigned and loaded in the alarm panel.

It can be appreciated that the type of information provided by the telephone network may vary. This information can be the telephone number of the service, the identity of the subscriber of the service or any other particular code provided by the telephone network. The present system merely uses the fact that there is identity information of the originating party provided by many telephone networks and this information can be used by the central computer or central station to improve the quality control. This information is preferably captured in the normal manner (an addressable revolving memory) by the receiving arrangement 14, which then combines or links this information with information from the calling alarm panel. The combined information is provided to the central computer through communication channel 15 in a data signal typically in a digital format. Thus, the receiving arrangement sends electronic signals to the central computer which reflects the combined information from the telephone exchange and the alarm panel. The central station 10 need not always be a computer, as in a simple system, it may be printer for producing a report of an occurrence and the details thereof.

Alarm panels which communicate with receiving arrangements associated with a central station are well known and complete a particular procedure, typically referred to as a "handshake" between the alarm panel and the receiving arrangement, prior to the receipt of the alarm information. The present system utilizes this existing approach and combines the information after the handshake (i.e. the alarm information, such as the account number plus alarm code information) with the telephone network information to provide more information in a data signal for processing by the central computer or a central station.

A further aspect of the invention is that the publicly switched telephone network, in addition to providing identity information, does provide a signal regarding time and date of the call. This can be recorded by the central computer as an independent source of the time and date when a telephone communication was completed between a alarm panel and the central computer. The time and date is typically part of the telephone information provided by the telephone network. Recording of the identity of the service and the time and date can then be used in the future. This is an independent time/date signal, and thus, may be helpful if, at a later point, a dispute arises with respect to the time and date of a communication. Typically, the central computer would include its own clock for recording of the time and date, but the fact that an independent time and date is also available may help to prove that an appropriate course of action had been taken by the central computer. Other telephone network information may be provided in the future which can be used by the present invention.

There are concerns that security systems can be sabotaged or subject to error. The matching of the caller identification information with the account number increases reliability. Furthermore, this system allows possible problem occurrences to be detected. For example, most security systems would not want the owner of an alarm system to move it from one location to another, for example from a home to a cottage, without at least subsequent reinstallation, as this may make proper alarm response difficult or impossible. The inventive system provides information regarding the telephone service used by the alarm panel and essentially confirms that the system has not been moved, i.e. the telephone number has not changed. As can be appreciated, moving of such a system can create a serious problem, as the space being monitored is not the same as the space recorded in the central computer. The system could be moved if prearranged and particularly if the automated hook up feature previously described is used.

There are other occurrences where an alarm panel may send out a wrong account number. In some cases, the central computer will not know of that account or will not have sufficient information regarding the account. In such occurrences, the information provided by the publicly switched telephone network can be used to determine the location or identity of the alarm panel. Furthermore, there are some circumstances where noise in transmission may result in errors. Again, the receipt of the information from the telephone network can reduce this problem or provide a backup. As can be appreciated, the telephone network information may be less subject to noise than the information originated at the alarm panel.

Sabotage of a central computer can occur by flooding of the central computer with false alarms. This requires substantial organization, as any security system typically has a host of receivers capable of receiving many calls. The receivers pass on the identity of the originating telephone service and this information can be used to provide a record of false calls (perhaps suggesting that a sabotage attempt is in progress) and possibly even the identity false callers.

At present, there are some jurisdictions where the telephone network cannot legally provide caller identification or any additional signal in the telephone communication which identifies the calling party. In such jurisdictions, it will not be possible to provide this information and the security system would operate in a conventional manner.

The present invention includes a receiving arrangement for receiving and linking telephone network information with alarm information and outputting the linked information in a data signal; a central station or computer which utilizes and appropriately processes the linked information, and in particular, identifies potential problems or discrepancies; and a security system which utilizes information provided by the telephone network with each communication to improve reliability, to simplify installation or other steps associated with installation.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A security system comprising a host of alarm panels each of which receives signals from sensors indicating the presence of an alarm condition in a space being monitored, each alarm panel includes means to originate a telephone communication over a telephone network to a receiving arrangement and provide information signals thereto regarding an alarm condition, said receiving arrangement being connected to and providing said information to a central computer which processes the information signals and based thereon adopts an appropriate course of action, said receiving arrangement upon initiation of a telephone communication from any of said alarm panels also includes means for receiving telephone network information from the telephone network which telephone network information is particular to a telephone service used by the alarm panel to originate the telephone communication and subsequently receives the information alarm signal from the alarm panel; said receiving arrangement, upon receipt of a telephone communication from an alarm panel, includes means to combine the telephone network information with information from the alarm panel and provides this combined information in a data signal to the central computer for processing.

2. A security system comprising a host of alarm panels located at remote locations connected to a telephone service of a public telephone network, each telephone service having telephone information known to the public telephone network, which telephone information uniquely identifies the telephone service, said security system including a security monitoring station connected to the public telephone network for receiving telephone communications from said alarm panels, each of said alarm panels having means for initiating and completing a telephone communication via the telephone network with a receiving arrangement of said security monitoring station, each of said alarm panels, when in telephone communication with said receiving arrangement for reporting detected alarm conditions, providing to said receiving arrangement alarm information specific to the detected alarm conditions and including information particular to each alarm panel uniquely identifying the alarm panel, said receiving arrangement additionally including means for receiving said telephone information from the public telephone network identifying the telephone service used by the alarm panel, said receiving arrangement including a processor which links the received telephone information and received alarm information of an alarm panel and having an output for providing the linked telephone information and alarm information to a central computer of said security system for processing and suitable response.

3. A security system as claimed in claim 2 wherein said telephone information is caller identification information.

4. A security system as claimed in claim 2 wherein the telephone information is a telephone number.

5. A security system as claimed in claim 2 wherein said telephone information includes the time and date of the communication.

6. A receiving arrangement for a security monitoring system where the receiving arrangement receives telephone communications from alarm panels of individual security systems and forwards, in an output signal for a processing computer, information provided by an alarm panel, said receiving arrangement comprising means for connecting to a public telephone network to receive telephone communications from any of the security alarm panels, means for receiving and storing caller identification information provided to the receiver by the public telephone network for each telephone communication received, means for receiving and storing alarm information communicated thereto by an alarm panel in a telephone communication, means for associating, in a receiver output signal, the caller identification information and the alarm information received each time an alarm panel initiates a telephone communication with said receiving arrangement in an output signal of the receiver, and means for connecting said receiving arrangement to the processing computer to provide said output signal to the processing computer, whereby said output signal for each communication received from an alarm panel has identification information provided by the alarm panel and caller identification information provided by the public telephone network allowing cross referencing by the processing computer.

7. A receiving arrangement as claimed in claim 6 wherein said output signal is an electronic digital data signal.

8. A receiving arrangement as claimed in claim 6 wherein said means for associating also provides date and time information provided by the telephone network to the receiver in the output signal.

9. A receiving arrangement as claimed in claim 6 wherein said receiving arrangement is in combination with a central computer and provides the output signal to said central computer.

* * * * *